(No Model.)
H. M. HORRNE.
RUNNING GEAR FOR WAGONS.
No. 331,137. Patented Nov. 24, 1885.
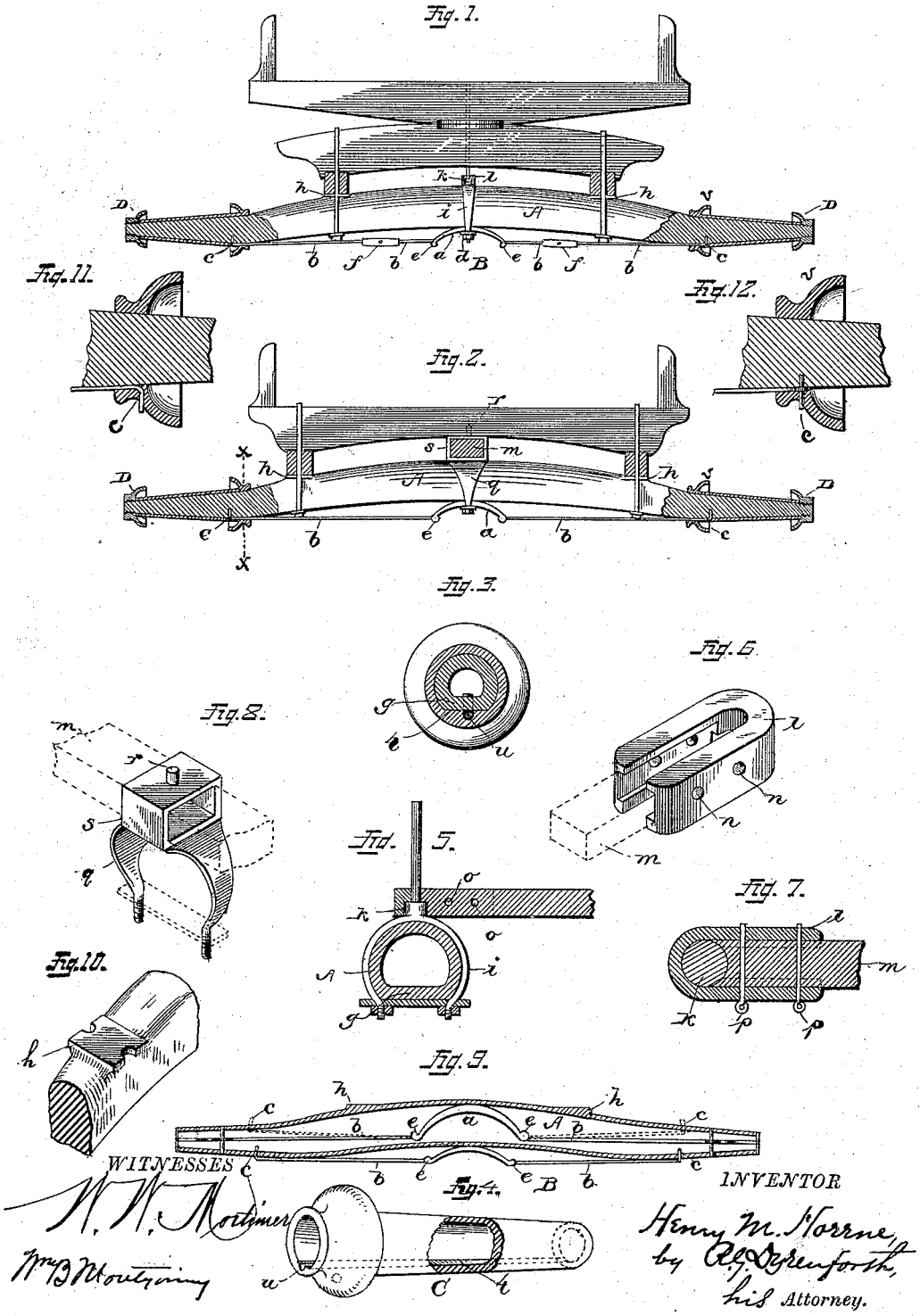
WITNESSES
INVENTOR
Henry M. Horrne,
by his Attorney.

UNITED STATES PATENT OFFICE.

HENRY M. HORRNE, OF BLOSSOM PRAIRIE, TEXAS.

RUNNING-GEAR FOR WAGONS.

SPECIFICATION forming part of Letters Patent No. 331,137, dated November 24, 1885.

Application filed April 30, 1885. Serial No. 164,002. (No model.)

*To all whom it may concern:*

Be it known that I, HENRY M. HORRNE, a citizen of the United States, residing at Blossom Prairie, in the county of Lamar and State of Texas, have invented certain new and useful Improvements in Skeletons or Frames for Wagons and other Vehicles, of which the following is a specification, reference being had therein to the accompanying drawings.

The invention in this case relates to the skeleton or frame of wagons or carriages, or to that part of the structure to which the wheels are attached and upon which the body of the vehicle rests.

The object of the invention is to produce a skeleton of great durability, one which is so formed as to guard against breakage and wear at the points where these are most liable to occur, and one which is simple and economical in construction; also to provide for the ready attachment, detachment, and adjustment of parts, and, generally, to render the structure safer and more convenient in use.

With this object in view my invention consists, primarily, in an axle provided with a spring attachment or cushion-brace or strain-distributer of sufficient strength connected to the axle, either directly or through the skein, to counteract the strain caused by the superincumbent weight or by any violence to which the axle may be subjected.

The invention consists, furthermore, in an axle flattened along its lower surface, to enable the axle to be secured against turning, and to present a firm resistance at the skein portion against any turning of the skein.

The invention consists, furthermore, in a skein having a flat longitudinal portion within to conform to the shape of the axle, and to combine with the peculiarly-shaped axle.

The invention consists, furthermore, in an axle having laterally-notched flattened parts on its upper surface, upon which the hounds or other parts will rest, these flattened surfaces serving, in connection with the flattened surface below, to allow the axle to be additionally secured against turning, and thus be held in rigid and correct position for the proper set of the wheels.

The invention consists, furthermore, in the combination, with the axle, of a spring and strain-rods connected to the spring and attached to the axle at the skein portion.

The invention consists, furthermore, in a construction of the axle-skein, whereby, in connection with the outer ends of the strain-rods, they will be held against longitudinal displacement inward.

The invention consists, furthermore, in a device for holding the skein against longitudinal displacement outward, which device also holds on the wheel, and also serves as a sand-guard.

The invention consists, finally, in means for holding the spring to the axle and for connecting the front and rear axles.

In order that the invention may be clearly understood, I will now proceed to describe it in detail, in connection with the accompanying drawings, forming part of my specification, in which—

Figure 1 is a front elevation of the fore part of the frame of a wagon embodying some of my improvements, the axle being partly broken away to show one way of attaching the strain-rods. Fig. 2 is a similar view of the rear part of the frame of the wagon. Fig. 3 is a section through the axle and skein on the line *x x* of Fig. 2, showing the flattened axle, the skein conforming thereto, the pin or hooked end of the strain-rod projecting inward through the hole in the axle, and a recess in the skein to receive the outer end of the strain-rod. Fig. 4 is an elevation of the skein, with a part broken away to expose the flat longitudinal portion within, by which it is restrained against turning upon the axle. Fig. 5 is a side view of the king-bolt and clip, showing the axle, the link, and the coupling-pole in section. Fig. 6 is a perspective view of the link, with the end of the coupling pole or reach inserted. Fig. 7 is a central horizontal section of the link and coupling-pole, the king-bolt being shown in position in cross-section, and the coupling-pins holding the coupling-pole within the link. Fig. 8 is a perspective view of the clip and coupling-eye pertaining to the rear axle, showing the projecting pin for insertion into the bolster. Fig. 9 is a central longitudinal vertical section of the axle, showing a modified form of spring attachment or strain-distributer applied thereto. Fig. 10 shows the notched flats on the axle; Fig. 11, an attachment of the strain-rod to the skein; Fig. 12, an attachment of a strain-rod to both skein and axle.

One of the greatest sources of evil in the use of wagons and carriages is the breaking of the axle on a line coincident with or near the inner end of the axle-skein, this particular part of the axle being generally subjected to the greatest continuous strain, and being the place where either when the axle is under continuous pressure or when it receives a sudden or violent shock the greatest leverage is exerted. The tendency is to force the central portion of the axle downward and the ends protected by the skeins upward, the breakage thus occurring just beyond the inner end of the skein. In order to distribute this strain, that it may not fall so decidedly upon the line of the inner end of the axle-skein, I provide the axle with a spring attachment or cushioned brace, through the elasticity or resiliency of which the strain will be diffused or spread.

It will at once be seen that my device differs from the rigid longitudinal braces or stay-irons which have been used heretofore.

In the drawings, A represents an axle, which is preferably made of iron and hollow and curved, though the distributer may with equal advantage be applied to wooden axles or to hollow iron axles that are straight. Underneath the axle is the distributer B, which in the present case I have shown as consisting of a central curved spring, $a$, and strain-rods $b$; but it is obvious that the distributer may be of different form, as that of a continuous spring, or consisting of a central spring of spiral form with the strain-rods, as shown. The points of attachment of the ends of the distributer are toward the ends of the axle at points within the skein portion, the ends to be attached to the axle or to the skein, as shown at $c$, Figs. 1 and 11, or to be attached to both the axle and the skein by a pin through an eye on the end of the rod, as shown in Fig. 12. It will be understood that the spring is to be under considerable tension—that is, under sufficient tension to counteract the effect of any weight that is likely to be upon the vehicle while the vehicle is subjected to rough usage.

The strain-distributer is fulcrumed, in the present instance, centrally at $d$, where the spring is attached to the axle, and the strain-rods are attached to the bent or hooked extremities of the spring by eyes, as shown at $e$.

To affix the distributer shown in Figs. 1 and 2, the spring is first attached to the axle, after which the eyes of the strain-rods may be slipped over its hooked extremities and then pulled outward until their outer bent ends are coincident with the holes in the axle or skein, when they are slipped into the same; or, the strain-rods being properly attached both to the spring and to the ends of the axle directly, or through the skein, the spring may be placed under tension, and the device thus caused to exert its functions as a distributer, by shortening the rods by means of one or more turn-buckles, $f$.

Instead of placing the strain-distributer on the outside of the hollow metallic axle, it may be placed within the same, as shown in Fig. 9. In such case the spring will bear centrally against the upper part of the axle, and may or may not be attached, and the outer ends of the strain-rods will be inserted into holes in the upper surface of the skein portion of the axle, and, if necessary, into the skein; or the rods may be attached to cross-bolts in the skein portion or at the ends of the axle. After fixing one strain-rod the other can be pulled into position through the open end of the axle. In some cases I may employ an external and an internal strain-distributer in connection with a hollow axle, as shown.

As has before been said, my strain-distributer, when used externally, is to be placed underneath the axle to exert its benefit; but far from exerting any benefit, it would be conducive of harm, if the axle did not remain rigidly in such position that the strain-distributer would always act in a line opposed to the line of weight, or to that of the effect of concussion. It is proper, therefore, that in connection with the strain-distributer means should be adopted for securing the axle rigidly in its proper position. To this end the axle is flattened along its under side, as shown in cross-section at $g$ in Fig. 5, and has flats or squares upon its upper surface, as shown at $h$, Figs. 1, 2, 9, and 10. These flats have notches, grooves, perforations, or projections on their outer sides. Upon these flats rest the hounds or other parts above the axle, according to the vehicle employed, and the axle is firmly and immovably attached to the bolster by means of U-shaped clips. The usual pillow which is commonly placed upon the iron axle is here dispensed with, and by dispensing with this and placing the hounds or other parts directly upon the axle I am enabled to bring the body of the vehicle lower, thus lowering the center of gravity and making it safer and easier to load. The clips embrace the bolster and the axle, their legs taking into the notches in the sides of the flats upon the axle, and the parts are held firmly together by means of the usual bar and nuts at the bottom. As shown in the drawings, the clips embrace the bolster and axle, but pass through the hounds. It will thus be seen that, while securing absolute rigidity of the axle with relation to the other parts, I refrain from weakening the same by perforating it, and this idea is continued in the attachment of the king-bolt and of the eye for the coupling-pole at the rear axle.

To employ a king-bolt which shall not weaken the axle, and to which the coupling-pole from the rear axle is attached, I construct the same as follows: The lower part is in the nature of a clip, $i$, which embraces the axle, as shown in Fig. 5, and which, when properly fastened by the usual bar and nuts, also serves to hold the spring $d$, as shown in Fig. 1. From the central upper portion of the clip rises the bolt proper, which passes through the bolsters. This bolt has an enlargement at its base forming a shoulder at $k$, upon which is placed the link $l$, suitably conformed, as shown, to fit upon the same. Into this link, which is grooved to receive it, is then passed the front end of the coupling-pole $m$, the coupling-pole having a semicircular depression in its end to fit snugly against the king-bolt. The link and coupling-pole are provided with perforations, as at $n\ o$, the coupling-pole to be held securely in the link by means of one or more pins, $p$. At the rear axle, where there is no king-bolt, the axle is held by means of a clip, $q$, and pin $r$, inserted into the bolster, and eyes upon the clip, serving to hold the coupling-pole $m$.

In addition to enabling the axle to be held rigidly in position, the flattening of the axle underneath also serves as a simple and efficient means of presenting a firm resistance at the skein portion against any turning of a skein, the skein being suitably conformed to the shape of the axle—that is to say, having a flat longitudinal portion within it to rest against the flat portion of the axle. The skein is shown in Fig. 4, the flat portion being marked $t$. It is obvious that the skein must be round outside; but the flattened portion within may be upon any part of the interior, and any part of the skein portion of the axle may be flattened to conform thereto, both skein and axle being flattened along one or more parts. At the inner end of the skein, at its flattened parts, I provide a notch, $u$, which serves to receive the outer end of one of the strain-rods $b$, when this is inserted directly into the axle, and by means of this notch a stop is formed, in connection with the bent outer end of the strain-rod, against any longitudinal displacement inward of the axle-skein. The skein has a concavo-convex rim, $v$, on its inner end, which covers the inner end of the wheel-hub and protects it from dust, mud, and other objectionable matter. The axle-skein is held upon the axle by means of a nut, D, which is screwed directly upon the end of the axle and against the end of the skein, thus serving also to hold on the wheel. This nut D is concavo-convex in form—that is, convex outside and cup-shaped interiorly—thus also serving as a most efficient sand-guard or sand-housing. In case the axle is of wood, the nut will be upon the skein, and the axle will be retained in the usual manner.

So, too, if the strain-rods are attached to the skein.

Having thus fully described my invention, what I claim is—

1. The combination, substantially as described, with an axle, of an elastic strain-distributer having its outer ends inserted at the skein portion of the axle, respectively, at points beyond the line of the inner end of the skein, for the purpose set forth.

2. An axle-skein having the flat longitudinal portion within and provided with a recess, substantially as and for the purpose set forth.

3. An axle flat along its lower side, with its body arched or oval in cross-section, and with tables or flats upon its top at suitable points, substantially as described.

4. The combination, with an axle, of a spring, and strain-rods connected to the spring and attached to the axle at the skein portion, as set forth.

5. The combination, with the axle, the spring, and the strain-rods, of an axle-skein provided with a recess for the reception of the end of the strain-rod, thus forming a stop against longitudinal displacement inward of the axle-skein, as described.

6. The nut for holding the skein against longitudinal displacement outward and simultaneously holding on the wheel alone, having a cup-shaped or concavo-convex rim to serve as a sand-guard, the nut forming a sand-housing, as set forth.

7. In combination with an axle, a skein provided with a concavo-convex rim on its inner end, substantially as and for the purpose described.

8. The combination, with the king-bolt having a clipped portion below, to avoid weakening of the axle, and a shoulder on the bolt above, of the link $l$, substantially as described.

9. The combination of the axle, king-bolt, the link, the coupling-pole, and the pins, substantially as described.

10. The combination of the king-bolt having the clip $i$ and shoulder $k$, the coupling-pole with the clip for the rear axle, and having the coupling-eye $s$ and pin $r$, as described.

In testimony whereof I affix my signature in presence of two witnesses.

HENRY M. HORRNE.

Witnesses:
R. G. DYRENFORTH,
GEO. F. GOERNER.